United States Patent
Morioka et al.

(10) Patent No.: US 7,459,020 B2
(45) Date of Patent: Dec. 2, 2008

(54) CEMENT ADMIXTURE, CEMENT COMPOSITION, AND CEMENT CONCRETE MADE THEREFROM

(75) Inventors: Minoru Morioka, Niigata (JP); Yasuhiro Nakashima, Niigata (JP); Takayuki Higuchi, Niigata (JP); Mitsuo Takahashi, Niigata (JP); Kenji Yamamoto, Niigata (JP); Etuo Sakai, Chiba (JP); Masaki Daimon, Tokyo (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 631 days.

(21) Appl. No.: 10/489,316

(22) PCT Filed: Jun. 7, 2002

(86) PCT No.: PCT/JP02/05655

§ 371 (c)(1),
(2), (4) Date: Mar. 18, 2004

(87) PCT Pub. No.: WO03/035570

PCT Pub. Date: May 1, 2003

(65) Prior Publication Data

US 2004/0231568 A1 Nov. 25, 2004

(30) Foreign Application Priority Data

Oct. 23, 2001 (JP) ............................. 2001-324636
Oct. 23, 2001 (JP) ............................. 2001-324640

(51) Int. Cl.
  *C04B 7/14* (2006.01)
  *C04B 18/14* (2006.01)
(52) U.S. Cl. ...................... 106/714; 106/789
(58) Field of Classification Search ................ 106/714, 106/789
See application file for complete search history.

(56) References Cited

U.S. PATENT DOCUMENTS 4,047,961 A * 9/1977 Alderete et al.
5,735,947 A * 4/1998 Hopkins et al. ............. 106/714
6,840,996 B2 * 1/2005 Morioka et al. ............. 106/714

FOREIGN PATENT DOCUMENTS

| EP | 869193 | 10/1998 |
|---|---|---|
| JP | 10-324547 | 12/1998 |
| JP | 11-100242 | 4/1999 |
| JP | 11-106243 | 4/1999 |
| JP | 2001-261415 | 9/2001 |
| KR | 1998-080729 | 11/1998 |

OTHER PUBLICATIONS

Answer 57 of 201 of Chem Abstracts on STN☐☐☐JP 2001261415 (Sep. 26, 2001) Morioka et al. (abstract only).*
Answer 96 of 201 of Chem Abstracts on STN☐☐☐JP 04321539 (Nov. 11, 1992) Momoi et al. (abstract only).*
Answer 97 of 201 of Chem Abstracts on STN☐☐☐JP 04132642 (May 6, 1992) Fujii et al. (abstract only).*
Answer 114 of 201 of Chem Abstracts on STN☐☐☐JP 58055350 (Apr. 1, 1983) Nippon Kokan KK Japan (abstract only).*
Minoru Morioka, "Jorei Slag Bifunmatsu no Koryudo Concrete eno Kento", CAJ Proceedings of Cement & Concrete, Japan Cement Association, Feb. 10, 2001, No. 54, pp. 44 to 49.
Edited by Kagaku Daijiten Henshu Iinkai, Kagaku Daijiten 9$^{th}$ reduced-size edition, Kyoritsu Shuppan Co., Ltd., Mar. 15, 1964, p. 234, left col., paragraph "Meli-seki".

* cited by examiner

*Primary Examiner*—Paul Marcantoni
(74) *Attorney, Agent, or Firm*—Oblon, Spivak, McClelland, Maier & Neustadt, P.C.

(57) ABSTRACT

A cement admixture of a low environmental load type, capable of reducing hexavalent chromium, having a small slump loss or heat of hydration, hardly neutralized and capable of suppressing autogenous shrinkage to a low level; a cement composition; and cement concrete employing it, are presented. The cement admixture comprises a slowly cooled slag powder which contains melilite as the main component and which has a carbon dioxide absorption of at least 2%, has a $CO_2$ absorption of at least 2%, has a loss on ignition of at most 5%, contains at least 0.5% of sulfur present as non-sulfuric acid form sulfur and/or has a concentration of non-sulfuric acid form sulfur to elute, of at least 100 mg/l, and further, preferably, has a degree of vitrification of at most 30%, a melilite lattice constant a of from 7.73 to 7.82 and/or a Blaine specific surface area of at least 4,000 cm$^2$/g.

19 Claims, No Drawings

CEMENT ADMIXTURE, CEMENT COMPOSITION, AND CEMENT CONCRETE MADE THEREFROM

TECHNICAL FIELD

The present invention relates to a cement admixture, a cement composition and cement concrete made thereof, which are to be used mainly in the field of civil engineering and construction. Here, cement concrete used in the present invention generally refers to cement paste, mortar and concrete. Further, parts or % in the present invention are by mass unless otherwise specified.

BACKGROUND ART

With respect to carbon dioxide emission, the proportion of civil engineering and construction in overall industry is very large, and it is desired to reduce its environmental load. On the other hand, carbon dioxide discharged from cement industry derives mostly from fuel during calcination or from decarboxylation of limestone as the starting material. Accordingly, in order to reduce the carbon dioxide emission, it is the most effective method to reduce the calcination amount of cement clinker, and it is extremely important to promote utilization of various mixed cements.

Further, with a view to constructing durable concrete structures, it is desired to prevent bleeding resulting from segregation and to suppress heat generation by hydration. Particularly, in recent years, the performance required for concrete is diversified, and for the purpose of rationalization of application, various types of high fluidity concrete have been proposed which require no compaction and which have self-filling properties ("Report I of JCI Ultra Fluidity Concrete Research Committee" (May 1003) and "Report II of the same" (May 1994), published by Japan Concrete Institute).

Such high fluidity concrete tends to undergo segregation if the unit quantity of a binder such as cement is less than about 500 kg/m$^3$, and accordingly, it usually has a unit binder quantity of at least about 500 kg/m$^3$. And, high fluidity concrete having a large unit binder quantity has a problem that the hydration heat value is large and the environmental load is also large.

In order to solve such a problem, high fluidity concrete has been proposed in which fine powder of limestone is used in substitution for a part of the binder (JP-A-5-319889). The fine powder of limestone shows no substantial hydraulicity, and accordingly, the high fluidity concrete in which fine powder of limestone is used in substitution for a part of the binder, has a merit such that it imparts segregation resistance without bringing about unnecessary heat of hydration. However, limestone is a valuable natural resource for our country having small resources, and its utilization merely for admixing it to concrete, is likely to lead to depletion of the resource. Accordingly, there are presently many voices for more effective utilization of limestone.

Further, limestone-admixed cement has a problem that it is likely to be neutralized, and it is poor in providing initial strength. Neutralization is important since it relates to durability of a ferroconcrete structure, and the initial strength is important, since it deeply relates to unmold cycle and thus is important for shortening the application period. Further, the neutralization is an important deterioration factor influential over the durability of ferroconcrete, and in neutralized concrete, the reinforcing steel will be corroded, and there will be a danger of falling of concrete fragments. At present, it is desired to develop a cement composition which is excellent in providing durability and initial strength and which is capable of providing strength equal to one where usual Portland cement is used alone, even if the admixture is used in combination in an amount exceeding 30%.

On the other hand, blast furnace slag discharged as industrial waste from steel plants is widely used in the cement concrete field. The blast furnace slag is generally classified into quenched and vitrified so-called granulated blast furnace slag and air-cooled and crystallized so-called slowly cooled blast furnace slag. Among them, the granulated blast furnace slag has alkali latent hydraulicity, and one pulverized to the same level as cement, or more finely than cement, is used as a starting material for blast furnace cement.

Vitrified granulated blast furnace slag has excellent latent hydraulicity whereby even when admixed in a large amount to cement clinker, its long term strength will not decrease, and its studies are being made in various fields of e.g. high strength concrete and high fluidity concrete ("Applicability of Fine Powder of Blast Furnace Slag to High Strength Concrete", Kenichi Yasudo et al., papers reported at the 45th Cement Technology Convention, pp. 184-189, 1991, etc.).

The vitrified granulated blast furnace slag has excellent latent hydraulicity whereby the strength will not decrease for a long period of time even when it is admixed in a large amount to cement clinker. However, on the other hand of exhibiting such high strength, the vitrified granulated blast furnace slag has had a problem such that heat generation by hydration and autogenous shrinkage tend to be substantial. Such heat generation and autogenous shrinkage are factors which induce cracking, and they are phenomena not desirable when durable ferroconcrete structures are to be constructed.

On the other hand, slowly cooled blast furnace slag is called also by another name i.e. crystallized slag or ballas and is one showing no hydraulicity. Accordingly, it was used mainly as a roadbed material, but recently, reclaimed aggregate has become to be preferentially used as a roadbed material. Thus, it is likely to lose the conventional application, and its useful application is still being sought ("Application of Blast Furnace Slag to Cement Concrete", Akihiko Yoda, Inorganic material, Vol. 6, pp. 62-67, 1999), "Law Relating to Promotion of Utilizing Reclaimed Resource, so-called recycle law", October 1991).

In recent years, a problem relating to durability of concrete has been taken up as a serious problem, and guidelines, principles for standardization, etc., relating to durable concrete have been published by various academic societies. Particularly, the water/cement ratio of concrete is substantially influential over the durability, and accordingly, for the purpose of reducing the unit quantity of water, frequency of use of a high performance water reducing agent or a high performance AE water reducing agent has rapidly increased, and guidelines therefor have also been issued.

However, there is a problem such that as the unit quantity of water is reduced, the change with time of consistency tends to be large, and the fluidity tends to decrease, and at present, there is no fundamental solution to this problem. It is particularly in the case of high fluidity concrete that the problem of the fluidity decrease is taken up as a serious problem.

High fluidity concrete is a concrete developed not to be susceptible to an influence due to the quality of workmanship, and its self-filling property is the most important characteristic. And it is required to maintain the fluidity during the transportation from the ready-mixed concrete plant to the application site and further for a certain period at the application site. However, due to some troubles at the application site or a traffic jam during the transportation, it may frequently take time over the prescribed time, whereby the fluidity of concrete tends to be outside the prescribed standard.

In such a case, there is no other means than carrying out so-called re-fluidizing treatment i.e. by additionally adding a high performance AE water reducing agent or the like to have it re-fluidized. However, at present, such re-fluidizing treatment can be done only by a skilled hand. Accordingly, it is strongly desired to develop concrete excellent in the fluidity-maintaining performance.

On the other hand, from the viewpoint of an environment problem, a large expectation is present with respect to reduction of hexavalent chromium which presents adverse effects against human bodies. A method has been proposed to reduce the amount of elution of hexavalent chromium by a reducing agent or adsorbent thereof. However, such a material is too expensive to be used in the field of cement concrete and is not substantially practically used.

Under these circumstances, the present inventors have conducted various studies on effective utilization of slowly cooled blast furnace slag and as a result, have found that a slowly cooled blast furnace slag powder has a function of suppressing neutralization, is excellent in the performance in maintaining fluidity and segregation resistance, has small autogenous shrinkage and can be made to be high fluidity concrete having low heat generation by hydration, and shows an effect to reduce hexavalent chromium under a prescribed condition, and further, by using a cement composition comprising a Portland cement having a $C_3S$ content of at least 60% and a slowly cooled blast furnace slag powder, it is possible to make a cement composition excellent in the initial strength-providing property and having little environmental load, whereby the conventional problems can be solved, and the present invention has been accomplished.

DISCLOSURE OF THE INVENTION

Namely, the present invention has the following construction.

(1) A cement admixture characterized by comprising a slowly cooled blast furnace slag powder which contains melilite as the main component and has a carbon dioxide absorption of at least 2% when carbonated for 7 days in the air having a carbon dioxide concentration of 5%, a temperature of 30° C. and a relative humidity of 60%.

(2) A cement admixture characterized by comprising a slowly cooled blast furnace slag powder which contains melilite as the main component and has a loss on ignition of at most 5%, which is a weight reduction when ignited at 1,000° C. for 30 minutes.

(3) A cement admixture characterized by comprising a slowly cooled blast furnace slag powder which contains melilite as the main component and contains at least 0.5% of sulfur present as non-sulfuric acid form sulfur.

(4) A cement admixture characterized by comprising a slowly cooled blast furnace slag powder which contains melilite as the main component and has an ion concentration of non-sulfuric acid form sulfur to elute, of at least 100 mg/l.

(5) The cement admixture according to any one of (1), (3) and (4), which comprises the slowly cooled blast furnace slag powder which contains melilite as the main component and has a loss on ignition of at most 5%, which is a weight reduction when ignited at 1,000° C. for 30 minutes.

(6) The cement admixture according to any one of (1), (2), (4) and (5), which comprises the slowly cooled blast furnace slag powder which contains melilite as the main component and contains at least 0.5% of sulfur present as non-sulfuric acid form sulfur.

(7) The cement admixture according to any one of (1) to (3), (5) and (6), which comprises the slowly cooled blast furnace slag powder which contains melilite as the main component and has a concentration of non-sulfuric acid form sulfur to elute, of at least 100 mg/l.

(8) The cement admixture according to any one of claims 1 to 7, which comprises the slowly cooled blast furnace slag powder having a degree of vitrification of at most 30%.

(9) The cement admixture according to any one of (1) to (8), which comprises the slowly cooled blast furnace slag powder having a melilite lattice constant a of from 7.73 to 7.82.

(10) The cement admixture according to any one of (1) to (9), which comprises the slowly cooled blast furnace slag powder having a Blaine specific surface area of at least 4000 $cm^2/g$.

(11) The cement admixture according to any one of (1) to (10), which has an oxygen consumption of at least $2.5 \times 10^{-3}$ $mmolO_2/g$.

(12) The cement admixture according to any one of (1) to (10), which has an oxidation-reduction potential of at least 100 mV.

(13) A cement composition containing the cement admixture as defined in any one of (1) to (12).

(14) The cement composition according to (13), wherein the cement is Portland cement having a $3CaO.SiO_2$ content of at least 60 wt %.

(15) Cement concrete made of the cement composition as defined in (13) or (14).

(16) The cement concrete according to (15), which has a slump flow of 650±50 mm.

BEST MODE FOR CARRYING OUT THE INVENTION

Now, the present invention will be described in detail.

The slowly cooled blast furnace slag powder (hereinafter referred to also simply as the slowly cooled slag powder) to be used in the present invention is an air-cooled and crystallized blast furnace slag powder. The components of the slowly cooled slag powder have the same composition as the granulated blast furnace slag, and specifically, it comprises $SiO_2$, CaO, $Al_2O_3$ and MgO as the main chemical components and may contain, for example, $TiO_2$, MnO, $Na_2O$, S, $P_2O_5$ and $Fe_2O_3$ as other components.

Further, the slowly cooled slag powder contains so-called melilite as the main component which is mixed crystal of gehlenite $2CaO.Al_2O_3.SiO_2$ and akermanite $2CaO.MgO.2SiO_2$ and further may contain others i.e. calcium silicates such as dicalcium silicate $2CaO.SiO_2$, rankinite $3CaO.2SiO_2$ and wollastonite $CaO.SiO_2$, calcium magnesium silicates such as merwinite $3CaO.MgO.2SiO_2$ and monticellite $CaO.MgO.SiO_2$, anorthite $CaO.Al_2O_3.2SiO_2$, leucite $(K_2O, Na_2O).Al_2O_3.SiO_2$, spinel $MgO.Al_2O_3$, magnetite $Fe_3O_4$, and a sulfide such as calcium sulfide CaS or iron sulfide FeS.

The slowly cooled slag powder to be used in the present invention contains melilite as the main component, and its carbon dioxide absorption (hereinafter referred to as the $CO_2$ absorption) is at least 2%. The $CO_2$ absorption of the slowly cooled slag powder is at least 2%, preferably at least 3%, more preferably at least 4%. If the $CO_2$ absorption is less than 2%, the effect for suppressing the neutralization will not be adequate, and there may be a case where no adequate effects of the present invention can be obtained.

The $CO_2$ absorption means the carbon dioxide absorption when carbonization is carried out for seven days in the air having a carbon dioxide gas concentration of 5%, a temperature of 30° C. and a relative humidity of 60%. In such a case, there may be a case where the is sample prior to carrying out carbonization treatment may contain carbon dioxide, and accordingly, it may be represented by the formula of (carbon dioxide absorption)=(the carbon dioxide amount of the sample after the carbonization treatment)−(the carbon dioxide amount of the sample prior to the carbonization treatment).

The $CO_2$ absorption can be obtained by quantifying the amount of carbon by the total carbon analysis and converting it to the $CO_2$ amount. Otherwise, it can be obtained also by e.g. a thermal analysis (TG-DTA or DSC).

Further, the loss on ignition (hereinafter referred to also as the bound water amount) of the slowly cooled slag powder is at most 5%. The bound water amount of the slowly cooled slag powder is at most 5%, preferably at most 4%, more preferably at most 3%. If the bound water amount exceeds 5%, excess strength, or the accompanying heat generation by hydration or autogenous shrinkage, tends to increase, and there may be a case where no adequate effects of the present invention will be obtained. The loss on ignition usually means a weight reduction when a sample is ignited at 1,000° C. for 30 minutes and is regarded as a bound water amount of a hydrated sample.

Pretreatment of a sample is carried out by removing excess water from a hydrated sample by a large amount of acetone, an alcohol or the like, followed by drying. The drying is carried out under such a drying condition that a part of the bound water of the hydrate will not be removed. For example, drying under reduced pressure is carried out by an aspirator to a constant weight.

Sulfur present as non-sulfuric acid form sulfur in the slowly cooled slag powder (hereinafter referred to simply as non-sulfuric acid form sulfur) is at least 0.5%. Here, the non-sulfuric acid form sulfur is meant for sulfur in a non-sulfuric acid form, such as a sulfide, a polysulfide, sulfur, thiosulfuric acid and sulfurous acid. The non-sulfuric acid form sulfur is at least 0.5%, preferably at least 0.7%, more preferably at least 0.9%. If the non-sulfuric form sulfur is less than 0.5%, there may be a case where no adequate effect of the present invention i.e. no adequate fluidity-maintaining performance or hexavalent chromium-reducing performance can be obtained.

The amount of the non-sulfuric acid form sulfur may be obtained by deducting the amount of sulfuric acid sulfur (sulfur trioxide) from the total sulfur amount, or it may be obtained as the sum of amounts of non-sulfuric acid form sulfurs such as thiosulfuric acid form sulfur and sulfurous acid sulfur. Such an amount may be obtained by quantifying by a method of Yamaguchi and Ono ("State Analysis of Sulfur in Blast Furnace Slag", Naoharu Yamaguchi and Akihiro Ono; Study on Steel Making, No. 301, pp. 37-40, 1980) or by quantifying by the method prescribed in JIS R 5202.

The slowly cooled slag powder exhibits the fluidity-maintaining performance and the effect of reducing hazardous heavy metals including hexagonal chromium, by containing the non-sulfuric acid form sulfur. However, even if a polysulfide, a sulfide, a thiosulfate, and a sulfite, etc. are merely added to slag not containing non-sulfuric acid form sulfur, it is not possible to obtain the fluidity-maintaining effect excellent in durability or the effect for reducing hazardous heavy metals such as hexagonal chromium, of the present invention. The hazardous heavy metals meant by the present invention include, for example, hexagonal chromium, lead, cadmium, nickel, mercury, arsenic, selenium, molybdenum, etc.

The amount of the reducing agent to be used is preferably from 1 to 50 parts by weight, particularly preferably from 5 to 40 parts by weight, per 100 parts by weight of the total of the slag powder and the reducing agent. If it is less than 1 part by weight, no adequate effect of the combined use will be obtained. On the other hand, if it exceeds 50 parts by weight, the cost increases, such being undesirable.

However, within a range not to impair the purpose of the present invention, it is preferred to use in combination various releasing agents which are commonly used as hexagonal chromium-reducing materials. Specifically, sulfides such as ammonium sulfide, calcium sulfide, copper sulfide, nickel sulfide, zinc sulfide, antimony sulfide, zirconium sulfide, sodium hydrogen sulfide, lithium hydrogen sulfide and ammonium polysulfide, sulfites such as potassium sulfite, ammonium sulfite, sodium sulfite, calcium sulfite, sodium sulfite and potassium hydrogen sulfite, thiosulfates such as sodium thiosulfate and potassium thiosulfate, sulfide compounds such as sulfur dioxide or sulfur, and ferrous sulfate, may, for example, be mentioned. Among them, ferrous sulfate is particularly effective.

Further, in the present invention, the ion concentration of non-sulfuric acid form sulfur which elutes from the slowly cooled slag powder (hereinafter referred to as the soluble sulfur concentration) is at least 100 mg/l. The soluble sulfur concentration is particularly preferably at least 150 mg/l. If the soluble sulfur concentration is less than 100 mg/l, there may be a case where no adequate fluidity-maintaining property or hexavalent chromium-reducing effect of cement concrete can be obtained.

Ions of non-sulfuric acid form sulfur may, for example, be sulfur ions ($S^{2-}$), polysulfide ions ($S_n^{2-}$, $n \geq 2$), thiosulfate ions ($S_2O_3^{2-}$), sulfite ions ($SO_3^{2-}$) and sulfate ions ($SO_4^{2-}$). The soluble sulfur concentration is the concentration of non-sulfuric acid form sulfur ions contained in the liquid phase, when 20 g of the slowly cooled slag powder is put into 100 ml of water at 20° C. and stirred for 30 minutes, followed by solid-liquid separation. Such a sulfur concentration can be quantified by an ICP emission spectrometry or by an ion chromatography.

The degree of vitrification of the slowly cooled slag powder is preferably at most 30%, more preferably at most 10%. If the degree of vitrification exceeds 30%, the heat of hydration is likely to increase, whereby there may be a case where the prescribed fluidity-maintaining performance, hexavalent chromium-reducing effects, neutralization-suppressing effects and effects to suppress heat generation by hydration cannot be obtained.

If the degree of vitrification is high, even if substantially the same amount of non-sulfuric acid form sulfur is contained, elution of e.g. thiosulfate sulfur is extremely little as compared with the crystalline slowly cooled slag, and the fluidity-maintaining performance or the hexavalent chromium-reducing effects are small. Further, as the degree of vitrification increases, there may be a case where heat generation accompanied by hydration will result.

Further, the neutralization-suppressing effects are also a nature characteristic to a crystalline substance. Accordingly, no such effects are likely to be observed as the degree of vitrification increases. The vitrification degree (X) is obtained by $X(\%)=(1-S/S_0)\times 100$. Here, S is the area of the main peak of melilite as the main crystalline compound in the slowly cooled slag powder, as obtained by the powder X-ray diffraction method, and $S_0$ is the area of the main peak of melilite in the product obtained by heating the slowly cooled slag powder at 1,000° C. for 3 hours, followed by cooling at a cooling rate of 5° C./min.

Further, the lattice constant a of mielilite of the slowly cooled slag powder is preferably from 7.73 to 7.82. The slowly cooled slag powder having the lattice constant a of melilite within this range is particularly preferred, since the neutralization-suppressing effects are remarkable. It is particularly preferred that the lattice constant a is from 7.75 to 7.80.

The Blaine specific surface area value (hereinafter also referred to simply as the Blaine value) of the slowly cooled slag powder is not particularly limited, but it is preferably at least 4,000 $cm^2/g$, more preferably from 4,500 $cm^2/g$ to 8,000 $cm^2/g$, most preferably from 5,000 $cm^2/g$ to 8,000 $cm^2/g$. If the Blaine value is less than 4,000 $cm^2/g$, there may be a case where the segregation resistance tends to be hardly obtainable, no adequate neutralization-suppressing effects can be obtained, or no adequate fluidity-maintaining performance or hexavalent chromium-reducing performance can be obtained. If it is pulverized to exceed 8,000 $cm^2/g$, the pulverization power is required to be large, such being uneconomical, and the slowly cooled slag powder is likely to be weathered, and there may be a case where deterioration with time of the quality tends to increase.

By this particle size, it is possible to control the amount of elution of thiosulfate sulfur, sulfite sulfur or the like. By increasing the fineness, the initial fluidity, the hexavalent chromium-reducing effects and neutralization-suppressing effects can be increased, and inversely, by decreasing the fineness, it becomes possible to present the fluidity-maintaining performance, the hexavalent chromium-reducing effects and the neutralization-preventing effects over a long period of time.

The oxygen consumption of the slowly cooled slag powder is preferably at least $2.5 \times 10^{-3}$ $mmolO_2/g$, more preferably at least $3.0 \times 10^{-3}$ $mmolo_2/g$. If it is less than $2.5 \times 10^{-3}$ $mmolO_2/g$, there may be a case where no adequate fluidity of cement concrete or hexavalent chromium-reducing effects can be obtained.

The oxygen consumption is an index to show the reducing ability of the slag powder. For example, 2 g of a slag powder and 40 ml of distilled water are mixed, shook for 2 hours and then subjected to filtration. To 10 ml of the filtrate, 10 ml of a 0.1 mol/l tetravalent cerium sulfate aqueous solution and a few drops of a 1/40 mol/l oxidation-reduction indicator ferroin are added, and tetravalent cerium remaining in the shaken liquid is titrated with 0.1 mol/l ferrous sulfate. From this value, the amount of tetravalent cerium (unit: mmol/g) reduced to trivalent by the slag powder is obtained, and one dividing this value by 4 is taken as the oxygen consumption (unit: $mmolO_2/g$).

The oxidation-reduction potential of the slowly cooled slag powder is preferably at least 100 mV, more preferably at least 150 mV. If it is less than 100 mV, there may be a case where no adequate hexavalent chromium-reducing effects can be obtained. The oxidation-reduction potential is one of indices showing the reducing ability of the slag powder. For example, 50 g of a slag powder and 100 ml of distilled water are mixed, shook for 24 hours and then subjected to filtration. The oxidation-reduction potential of the filtrate is measured by a prescribed ORP electrodes to obtain ORP1. Then, the pH of this filtrate is measured, and the oxidation-reduction potential ORP2 of distilled water adjusted to the same pH, is measured. The difference between ORP2 and ORP1 (ORP2-ORP1) is taken as the oxidation-reduction potential (unit: mV).

The cement admixture of the present invention (hereinafter referred to simply as the present admixture) comprises a slowly cooled slag powder which contains melilite as the main component and has a carbon dioxide absorption of at least 2% and a loss on ignition of at most 5%, contains at least 0.5% of sulfur present as non-sulfuric acid form sulfur, and has a concentration of non-sulfuric acid form sulfur to elute, of at least 100 mg/l, further preferably, a slowly cooled slag powder which has a degree of vitrification of at most 30%, a lattice constant a of melilite of from 7.73 to 7.82, and/or a Blaine specific surface area of at least 4,000 $cm^2/g$.

The Blaine value of the present admixture is not particularly limited, but it is preferably at least 4,000 $cm^2/g$, more preferably from 4,500 $cm^2/g$ to 8,000 $cm^2/g$, most preferably from 5,000 $cm^2/g$ to 8,000 $cm^2/g$. If the Blaine value is less than 4,000 $cm^2/g$, there may be a case where no adequate effects of the present invention can be obtained, and if it is pulverized to exceed 8,000 $cm^2/g$, the pulverization power is required to be large, such being uneconomical, and the slowly cooled slag powder is likely to be weathered, and there may be a case where deterioration with time of the quality tends to be substantial.

The amount of the present admixture to be used, is not particularly limited, but it is usually preferably from 3 to 60 parts, more preferably from 5 to 50 parts, most preferably from 10 to 40 parts, in 100 parts of the cement composition comprising cement and the present admixture. If it is less than 3 parts, no adequate effects of the present invention such as to reduce the heat of hydration or to improve the fluidity-maintaining property, and if it is used in excess of 60 parts, there may be a case where the strength-providing property tends to be poor.

Here, as the cement, various Portland cements such as ordinary, high-early-strength, ultra high-early-strength, low heat and moderate-heat, Portland cements, various blended cements having granulated blast furnace slag, fly ash or silica blended to such Portland cements, and a filler cement having limestone powder mixed, may, for example, be mentioned. One or more of them may be used.

In the present invention, it is possible to obtain a cement composition excellent in the initial strength-developing property by combining the present admixture with a Portland cement having a $3CaO.SiO_2$ ($C_3S$) content of at least 60 wt %. Usually, the Portland cement is constituted by gypsum and clinker composed mainly of $2CaO.SiO_2$ ($C_2S$), $C_3S$, $3CaO.Al_2O_3$ ($C_3A$) and $4CaO.Al_2O_3.Fe_2O_3$ ($C_4AF$).

The Portland cement having a $C_3S$ content of at least 60% of the present invention is not particularly limited, and a commercially available high-early-strength cement or ultra-high-early-strength cement may, for example, be used. Further, the particle size of the Portland cement having a $C_3S$ content of at least 60%, is not particularly limited, but it is usually preferably at a level of from 3,000 to 8,000 $cm^2/g$ by a Blaine value. If the Blaine value is less than 3,000 $cm^2/g$, no adequate early strength developing property may sometimes be obtainable, and for pulverization to exceed 8,000 $cm^2/g$, the pulverization power tends to be extremely large, such being uneconomical, and the operation efficiency may be likely to be poor.

The cement composition of the present invention is one comprising cement and the present admixture. For the cement composition of the present invention, the respective materials may be mixed at the time of the application, or a part or whole thereof may be preliminarily mixed. For example, a slowly cooled slag powder, cement clinker and gypsum may separately be pulverized and mixed, or a part or whole of them may be mixed and pulverized.

The particle size of the cement composition of the present invention is not particularly limited, since it depends on the particular purpose or application. Usually, it is preferably from 3,000 to 8,000 $cm^2/g$, more preferably from 4,000 to 6,000 $cm^2/g$, by a Blaine value. If it is less than 3,000 $cm^2/g$, there may be a case where no adequate strength-developing property can be obtained, and if it exceeds 8,000 $cm^2/g$, there may be a case where the operation efficiency tends to be poor.

The cement composition of the present invention has a self-filling property requiring no conventional shaking compaction and can be used as high fluidity concrete free from segregation, whereby the slump flow value as an index of fluidity is preferably 650±50 mm. If the slump flow value is less than 600 mm, the self-filling property is likely to be inadequate due to a change with time when the time required for the application or transportation is taken into account, and if it exceeds 700 mm, there may be a case where segregation is likely to result.

When high fluidity concrete is to be prepared, it is preferred to employ a water reducing agent such as a usual water reducing agent, an AE reducing agent, a high performance reducing agent or a high performance AE reducing agent, for high fluidity. The water reducing agent is commercially available in the form of a liquid or powder, and either one may be used. Water reducing agents may be generally classified into a naphthalene type, a melamine type, an amino sulfonic acid type and a polycarboxylic acid type.

In the present invention, it is particularly preferred to use a high performance AE reducing agent, and its specific examples include, for example, a naphthalene type, such as "Rheobuild SP-9 Series", trade name, manufactured by NMB Co., Ltd., "Mighty 2000 Series", trade name, manufactured by Kao Corporation and "Sunflow HS-100", trade name, manufactured by Nippon Paper Industries Co., Ltd. Further, as a melamine type, "Sikament 1000 Series", trade name, manufactured by Sika Ltd., or "Sunflow HS-40", trade name, manufactured by Nippon Paper Industries Co., Ltd., may, for example, be mentioned.

Further, as the aminosulfonic acid type, "Palic FP-200 Series", trade name, manufactured by Fujisawa Pharmaceutical Co., Ltd., may, for example, be mentioned. And as the polycarboxylic acid type, "Rheobuild SP-8 Series", trade name, manufactured by NMB Co., Ltd., "Darex Super 100PHX", trade name, manufactured by W. R. Grace & Co., and "Chupol HP-8 Series" or "Chupol HP-11 Series", trade name, manufactured by Takemoto Oil & Fat Co., Ltd., may, for example, be mentioned.

In the present invention, one or more of these water reducing agents can be used. The amount of the water reducing agent to be used, is not particularly limited. However, usually, it may be used within a range which is specified by each manufacturer, and specifically, it is at a level of from 0.5 to 3.0 parts per 100 parts of the cement composition comprising cement and the present admixture.

In the present invention, the amount of water to be used, is not particularly limited. However, usually, it is preferably from 125 to 225 kg, more preferably from 140 to 185 kg, per 1 $m^3$ of the cement concrete. If it is less than 125 kg, the operation efficiency is likely to be poor, and if it exceeds 185 kg, the dimensional stability, strength-developing property and durability are likely to be poor.

In the present invention, in addition to the cement, the present admixture, aggregates such as sand or gravel, and the water reducing agent, one or more may be used within a range not to substantially impair the purpose of the present invention, among additives such as granulated blast furnace slag powder, fine limestone powder, fly ash and silica fume, a defoaming agent, a thickener, a rust-preventive agent, an antifreezer, a shrinkage-reducing agent, a polymer emulsion, a setting modifier, a clay mineral such as bentonite, and an anion exchanger such as hydrotalcite, which used to be employed for e.g. high fluidity concrete.

In the present invention, the method for mixing various materials is not particularly limited, and the respective materials may be mixed at the time of the application, or a part or whole may be preliminarily mixed. As the mixing apparatus, any conventional apparatus may be used. For example, it is possible to use a tilting mixer, an omini mixer, a Henschel mixer, a V-form mixer and Nauta mixer.

Now, the present invention will be described in detail with reference to Examples.

TEST EXAMPLE 1

Concrete having an air amount of 4.5±1.5% and s/a=46% was prepared by using the concrete blend composition as shown in Table 1 comprising cement A, water, sand, gravel and various slag powders as the cement admixture, and the slump loss, compression strength, adiabatic temperature increase and neutralization depth were measured.

Further, comparison was carried out with a blend composition by mixing fine limestone powder instead of the slag powder to obtain an equal compression strength with the same blend proportions. The results are shown also in Table 1. Further, a water reducing agent was used so that the slump value of the concrete would be 18±1.5 cm.

| Materials used | |
| --- | --- |
| Cement A: | Ordinary Portland cement manufactured by Denki Kagaku Kogyo Kabushiki Kaisha, $C_3S$ content: 55%, Blaine value: 3,200 $cm^2/g$, density: 3.15 $g/cm^3$ |
| Slag powder (1): | Slowly cooled slag powder, $CO_2$ absorption: 2%, amount of bound water: 2%, degree of vitrification: 5%, melilite lattice constant a: 7.78, Blaine value: 4,000 $cm^2/g$, density: 3.00 $g/cm^3$ |
| Slag powder (2): | Slowly cooled slag powder, $CO_2$ absorption: 3%, amount of bound water: 2.5%, degree of vitrification: 5%, melilite lattice constant a: 7.78, Blaine value: 4,500 $cm^2/g$, density: 3.00 $g/cm^3$ |

-continued

| | |
|---|---|
| Slag powder (3) | Slowly cooled slag powder, $CO_2$ absorption: 3.5%, amount of bound water: 2.7%, degree of vitrification: 5%, melilite lattice constant a: 7.78, Blaine value: 5,000 $cm^2/g$, density: 3.00 $g/cm^3$ |
| Slag powder (4): | Slowly cooled slag powder, $CO_2$ absorption: 4%, amount of bound water: 3%, degree of vitrification: 5%, melilite lattice constant a: 7.78, Blaine value: 6,000 $cm^2/g$, density: 3.00 $g/cm^3$ |
| Slag powder (5): | Slowly cooled slag powder, $CO_2$ absorption: 4.5%, amount of bound water: 4%, degree of vitrification: 5%, melilite lattice constant a: 7.78, Blaine value: 8,000 $cm^2/g$, density: 3.00 $g/cm^3$ |
| Slag powder (6): | Slowly cooled slag powder, $CO_2$ absorption: 3.5%, amount of bound water: 3%, degree of vitrification: 10%, melilite lattice constant a: 7.76, Blaine value: 6,000 $cm^2/g$, density: 2.97 $g/cm^3$ |
| Slag powder (7): | Slowly cooled slag powder, $CO_2$ absorption: 3%, amount of bound water: 5%, degree of vitrification: 30%, melilite lattice constant a: 7.74, Blaine value: 6,000 $cm^2/g$, density: 2.94 $g/cm^3$ |
| Slag powder (8): | Slowly cooled slag powder, $CO_2$ absorption: 1%, amount of bound water: 9.5%, degree of vitrification: 95%, Blaine value: 6,000 $cm^2/g$, density: 2.90 $g/cm^3$ |
| Water: | Tap water |
| Sand: | Produced in Himekawa, Niigata Prefecture; density: 2.62 $g/cm^3$ |
| Gravel: | Produced in Himekawa, Niigata Prefecture; crushed stone, density: 2.64 $g/cm^3$ |
| Water reducing agent: | High performance AE water reducing agent, polycarboxylic acid type, commercial product |

Measuring methods

| | |
|---|---|
| Slump loss: | A slump value was measured in accordance with JIS A 1101, and from the slump value immediately after mixing, the slump value upon expiration of 90 minutes was deducted to obtain the slump loss value. |
| Compressing strength: | A sample of 10φ × 20 cm was prepared, and the compression strength of the material age of 29 days was measured in accordance with JIA A 1108. |
| Diabatic temperature increase: | Measured by means of an adiabatic temperature increase-measuring apparatus manufactured by Tokyo Riko K.K. under a condition of a working temperature of 20° C. |
| Neutralization depth: | A sample of 10φ × 20 cm was prepared and aged in water of 20° C. till a material age of 28 days, whereupon accelerated neutralization was carried out in an environment having a temperature of 30° C., a relative humidity of 60% and a carbon dioxide gas concentration of 5%, and upon expiration of 6 months, the sample was cut into round slices, whereby a phenolphthalein alcohol solution was coated on the cross-section to confirm the neutralization depth. |

TABLE 1

| | Unit weight (kg/cm³) | | | | | | Adiabatic | | |
|---|---|---|---|---|---|---|---|---|---|
| Test No. | Cement | Water | Sand | Gravel | Slag powder | Slump loss | Compression strength | temperature increase | Neutralization depth | Notes |
| 1-1 | 245 | 175 | 804 | 951 | (1)105 | 9.5 | 24.0 | 34.0 | 27.0 | Ex. |
| 1-2 | 245 | 175 | 804 | 951 | (2)105 | 8.5 | 24.2 | 34.3 | 23.5 | Ex. |
| 1-3 | 245 | 175 | 804 | 951 | (3)105 | 7.5 | 24.3 | 34.5 | 19.5 | Ex. |
| 1-4 | 245 | 175 | 804 | 951 | (4)105 | 7.0 | 24.4 | 34.8 | 18.5 | Ex. |
| 1-5 | 245 | 175 | 804 | 951 | (5)105 | 6.0 | 24.9 | 34.9 | 16.0 | Ex. |
| 1-6 | 245 | 175 | 804 | 951 | (6)105 | 8.0 | 25.1 | 35.3 | 17.0 | Ex. |
| 1-7 | 245 | 175 | 803 | 950 | (7)105 | 9.5 | 26.2 | 37.0 | 17.5 | Ex. |
| 1-8 | 245 | 175 | 803 | 950 | (8)105 | 11.5 | 33.9 | 44.2 | — | Comp. Ex. |
| 1-9 | 350 | 175 | 806 | 954 | —0 | 12.0 | 33.5 | 45.5 | — | Comp. Ex. |
| 1-10 | 339 | 175 | 806 | 954 | (4)11 | 11.5 | 33.2 | 44.1 | — | Ex. |
| 1-11 | 332 | 175 | 806 | 954 | (4)18 | 10.5 | 32.8 | 43.5 | — | Ex. |
| 1-12 | 315 | 175 | 805 | 953 | (4)35 | 9.5 | 30.7 | 41.4 | — | Ex. |
| 1-13 | 280 | 175 | 805 | 952 | (4)70 | 8.5 | 27.5 | 37.8 | — | Ex. |
| 1-14 | 210 | 175 | 803 | 950 | (4)140 | 6.0 | 22.3 | 31.0 | — | Ex. |
| 1-15 | 175 | 175 | 803 | 950 | (4)175 | 5.0 | 20.3 | 28.2 | — | Ex. |
| 1-16 | 140 | 175 | 802 | 949 | (4)210 | 4.0 | 18.0 | 25.0 | — | Ex. |
| 1-17 | 245 | 175 | 804 | 951 | * 105 | 11.5 | 24.8 | 34.5 | 42.5 | Comp. Ex. |

Symbol * for slag powder means fine limestone powder, and the slump loss is represented by "cm", the compression strength by "N/mm²", the adiabatic temperature increase by "° C.", and the neutralization depth by "mm".

TEST EXAMPLE 2

The test was carried out in the same manner as in Test Example 1 except that concretes having concrete blend compositions as shown in Table 2 were prepared by using slowly cooled slag powders shown in Table 2, which are the same in the Blaine value and the degree of vitrification and which are different only in the melilite lattice constant a. The results are also shown in Table 2.

| | Materials used |
|---|---|
| Slag powder (9): | Slowly cooled slag powder, $CO_2$ absorption: 4%, amount of bound water: 3%, degree of vitrification: 5%, melilite lattice constant a: 7.73, Blaine value: 6,000 $cm^2/g$, density: 3.03 $g/cm^3$ |
| Slag powder (10): | Slowly cooled slag powder, $CO_2$ absorption: 4.5%, amount of bound water: 3%, degree of vitrification: 5%, melilite lattice constant a: 7.75, Blaine value: 6,000 $cm^2/g$, density: 3.01 $g/cm^3$ |
| Slag powder (11): | Slowly cooled slag powder, $CO_2$ absorption: 4.5%, amount of bound water: 3%, degree of vitrification: 5%, melilite lattice constant a: 7.80, Blaine value: 6,000 $cm^2/g$, density: 2.98 $g/cm^3$ |
| Slag powder (12): | Slowly cooled slag powder, $CO_2$ absorption: 4%, amount of bound water: 3%, degree of vitrification: 5%, melilite lattice constant a: 7.83, Blaine value: 6,000 $cm^2/g$, density: 2.96 $g/cm^3$ |

TABLE 2

| Test No. | Unit weight ($kg/cm^3$) | | | | | Slump loss | Compression strength | Adiabatic temperature increase | Neutralization depth | Notes |
|---|---|---|---|---|---|---|---|---|---|---|
| | Cement | Water | Sand | Gravel | Slag powder | | | | | |
| 2-1 | 245 | 175 | 804 | 951 | (9)105 | 7.5 | 24.5 | 34.8 | 22.0 | Ex. |
| 2-2 | 245 | 175 | 804 | 951 | (10)105 | 7.5 | 24.2 | 34.7 | 20.5 | Ex. |
| 1-4 | 245 | 175 | 804 | 951 | (4)105 | 7.0 | 24.4 | 34.8 | 18.5 | Ex. |
| 2-3 | 245 | 175 | 804 | 951 | (11)105 | 7.0 | 24.7 | 34.8 | 19.0 | Ex. |
| 2-4 | 245 | 175 | 804 | 951 | (12)105 | 7.0 | 24.9 | 34.9 | 19.5 | Ex. |
| 2-5 | 245 | 175 | 804 | 951 | * 105 | 7.0 | 24.9 | 34.9 | 42.5 | Comp. Ex. |

Symbol * for slag powder means fine limestone powder, and the slump loss is represented by "cm", the compression strength by "$N/mm^2$", the adiabatic temperature increase by "° C.", and the neutralization depth by "mm".

TEST EXAMPLE 3

50 parts of water and 300 parts of sand were mixed to 100 parts of a cement composition comprising 65 parts of Portland cement shown in Table 3 and 35 parts of slag powder (2), to prepare a mortar, whereupon measurement of the compression strength was carried out. The results are also shown in Table 3.

| Materials used | |
|---|---|
| Cement B: | High-early-strength Portland cement manufactured by Denki Kagaku Kogyo Kabushiki Kaisha, $C_3S$ content: 65%, Blaine value: 4,400 $cm^2/g$ |
| Cement C: | Mixture comprising 50 parts of Cement A and 50 parts of Cement B, $C_3S$ content: 60%, Blaine value: 3,800 $cm^2/g$ |
| Sand: | JIS standard sand (in accordance with ISO679) |
| Measuring method | |
| Compressing strength: | Measured in accordance with JIS R 5201. |

TABLE 3

| Test No. | Cement | Slag powder | Compression strength | | | Notes |
|---|---|---|---|---|---|---|
| | | | 1 day | 3 days | 7 days | |
| 3-1 | A | Nil | 10.5 | 23.0 | 41.0 | Comp. Ex. |
| 3-2 | A | 35 | 7.9 | 16.2 | 29.3 | Ex. |
| 3-3 | B | 35 | 13.3 | 26.4 | 44.9 | Ex. |
| 3-4 | C | 35 | 11.8 | 24.7 | 43.0 | Ex. |

The slag powder is represented by "parts" per 100 parts of the powder, and the compression strength is represented by "$N/mm^2$"

TEST EXAMPLE 4

This test was carried out in the same manner as in Test Example 3 except that using Cement B, the slowly cooled slag powder (2) shown in Table 4 was used in 100 parts of a cement composition comprising Cement B and the slag powder. The results are also shown in Table 4.

TABLE 4

| Test No. | Cement | Slag powder | Compression strength | | | Notes |
|---|---|---|---|---|---|---|
| | | | 1 day | 3 days | 7 days | |
| 3-1 | A | Nil | 10.5 | 23.0 | 41.0 | Comp. Ex. |
| 4-1 | B | 10 | 19.5 | 39.2 | 54.1 | Ex. |
| 4-2 | B | 20 | 18.3 | 36.2 | 51.3 | Ex. |
| 4-3 | B | 30 | 15.3 | 31.8 | 47.1 | Ex. |
| 3-3 | B | 35 | 13.3 | 26.4 | 44.9 | Comp. Ex. |
| 4-4 | B | 40 | 12.6 | 25.7 | 44.3 | Ex. |
| 4-5 | B | 50 | 11.6 | 24.9 | 43.2 | Ex. |

The slag powder is represented by "parts" per 100 parts of the powder, and the compression strength is represented by "N/mm$^2$"

TEST EXAMPLE 5

The test was carried out in the same manner as in Test Example 1 except that using Cement A, high fluidity concretes having concrete blend compositions as identified in Table 5 were prepared, and the segregation, slump loss, autogenous shrinkage, adiabatic temperature increase, compression strength and neutralization depth were measured.

Further, a water reducing agent was used in combination so that the slump flow value of the concretes would be 600±50 mm. The results are also shown in Table 5.

| Measuring methods | |
|---|---|
| Segregation: | Visually observed. A case where segregation resulted, is represented by x, a case where slight segregation was observed, is represented by Δ, and a case where no segregation resulted, is represented by o. |
| Slump flow: | Spreading of concrete was measured at two points in right angle directions in accordance with "Underwater Non-separable Concrete Manual, Appendix 1 "Test On Underwater Non-separable Concrete, Test On Slump Flow", published by Foundation, Coastal Development Technical Center and the Japanese Institute of Technology on Fishing Ports and Communities, and the average value was taken as the slump flow. |
| Autogenous shrinkage: | Measured in accordance with the report by JCI autogenous shrinkage study committee. It is represented as an autogenous shrinkage strain at a material age of 56 days. |

TABLE 5

| Test No. | Unit weight (kg/cm$^3$) | | | | | Segregation | Slump flow | | Autogenous shrinkage | Adiabatic Temperature increase | Compression strength | Neutralization depth | Notes |
| | Cement | Water | Sand | Gravel | Slag powder | | 0 min | 60 min | | | | | |
|---|---|---|---|---|---|---|---|---|---|---|---|---|---|
| 5-1 | 300 | 165 | 769 | 839 | (1)250 | Δ | 665 | 680 | −50 | 41.8 | 52.0 | 4.5 | Ex. |
| 5-2 | 300 | 165 | 769 | 839 | (2)250 | o | 670 | 680 | −40 | 41.8 | 53.5 | 3.0 | Ex. |
| 5-3 | 300 | 165 | 769 | 839 | (3)250 | o | 675 | 685 | −40 | 41.9 | 54.0 | 3.0 | Ex. |
| 5-4 | 300 | 165 | 769 | 839 | (4)250 | o | 675 | 685 | −40 | 42.0 | 54.5 | 2.5 | Ex. |
| 5-5 | 300 | 165 | 769 | 839 | (5)250 | o | 670 | 685 | −40 | 42.2 | 55.0 | 2.0 | Ex. |
| 5-6 | 300 | 165 | 767 | 837 | (6)250 | o | 675 | 655 | −110 | 44.0 | 60.5 | 1.0 | Ex. |
| 5-7 | 300 | 165 | 766 | 836 | (7)250 | o | 675 | 555 | −220 | 47.3 | 70.1 | 0.5 | Ex. |
| 5-8 | 300 | 165 | 765 | 835 | (8)250 | o | 685 | 390 | −380 | 66.5 | 79.8 | 1.0 | Comp. Ex. |
| 5-9 | 300 | 165 | 757 | 826 | * 250 | o | 680 | 410 | −40 | 42.3 | 55.0 | 12.5 | Comp. Ex. |

The slump flow is represented by "mm", the autogenous shrinkage by a strain "×10$^{-6}$", the adiabatic temperature increase by "° C.", the compression strength by "N/mm$^2$", and the neutralization depth by "mm" and * for the slag powder means fine limestone powder.

TEST EXAMPLE 6

This test was carried out in the same manner as in Test Example 5 except that using the slag powder (4), the concrete blend composition as shown in Table 6 was used. The results are also shown in Table 6.

TABLE 6

| Test No. | Unit weight (kg/cm$^3$) | | | | | Segregation | Slump flow | | Autogenous shrinkage | Adiabatic Temperature increase | Compression strength | Neutralization depth | Notes |
| | Cement | Water | Sand | Gravel | Slag powder | | 0 min | 60 min | | | | | |
|---|---|---|---|---|---|---|---|---|---|---|---|---|---|
| 6-1 | 250 | 165 | 768 | 838 | 300 | o | 680 | 690 | +70 | 36.8 | 41.2 | 3.0 | Ex. |
| 6-2 | 275 | 165 | 768 | 838 | 275 | o | 675 | 685 | −10 | 39.4 | 49.1 | 3.0 | Ex. |
| 5-4 | 300 | 165 | 769 | 839 | 250 | o | 675 | 685 | −40 | 41.8 | 53.5 | 3.0 | Ex. |
| 6-3 | 325 | 165 | 769 | 839 | 225 | o | 670 | 670 | −90 | 44.4 | 57.0 | 2.5 | Ex. |
| 6-4 | 350 | 165 | 769 | 839 | 200 | o | 670 | 660 | −150 | 46.8 | 62.5 | 2.0 | Ex. |
| 6-5 | 450 | 165 | 771 | 842 | 100 | o | 675 | 600 | −250 | 56.9 | 71.5 | 0.0 | Ex. |
| 6-6 | 550 | 165 | 773 | 844 | 0 | o | 650 | 380 | −390 | 66.7 | 80.4 | 0.0 | Comp. Ex. |
| 6-7 | 300 | 165 | 873 | 953 | 0 | X | — | — | — | — | — | — | Comp. Ex. |

TABLE 6-continued

| Test No. | Unit weight (kg/cm³) | | | | | Segregation | Slump flow | | Autogenous shrinkage | Adiabatic Temperature increase | Compression strength | Neutralization depth | Notes |
|---|---|---|---|---|---|---|---|---|---|---|---|---|---|
| | Cement | Water | Sand | Gravel | Slag powder | | 0 min | 60 min | | | | | |
| 6-8 | 300 | 125 | 820 | 895 | 250 | ○ | 690 | 680 | −120 | 41.8 | 64.0 | 0.0 | Ex. |
| 6-9 | 300 | 175 | 757 | 826 | 250 | ○ | 685 | 660 | −10 | 42.0 | 49.0 | 3.5 | Ex. |
| 6-10 | 300 | 200 | 725 | 792 | 250 | ○ | 670 | 610 | +110 | 42.2 | 33.5 | 6.5 | Ex. |
| 6-11 | 300 | 225 | 694 | 757 | 250 | ○ | 640 | 550 | +150 | 42.3 | 28.0 | 12.0 | Ex. |
| 6-12 | 300 | 165 | 759 | 828 | 275 | ○ | 670 | 680 | −40 | 41.9 | 53.9 | 2.5 | Ex. |
| 6-13 | 300 | 165 | 748 | 817 | 300 | ○ | 670 | 680 | −40 | 42.1 | 54.2 | 2.0 | Ex. |
| 6-14 | 300 | 165 | 738 | 805 | 325 | ○ | 665 | 680 | −50 | 42.4 | 54.7 | 1.5 | Ex. |
| 6-15 | 300 | 165 | 727 | 794 | 350 | ○ | 665 | 680 | −50 | 42.6 | 55.0 | 1.0 | Ex. |

The slump flow is represented by "mm", the autogenous shrinkage by a strain "× $10^{-6}$", the adiabatic temperature increase by "° C.", the compression strength by "N/mm²", and the neutralization depth by "mm" and symbol — for the autogenous shrinkage in Test No. 1-7 means that segregation resulted, so that high fluidity concrete was not prepared.

TEST EXAMPLE 7

Using Cement A, concrete having a concrete blend composition as identified in Table 5 was prepared, and measurement of the slump loss was carried out and the hexavalent chromium-reducing ability of the slag powder was evaluated by measuring the hexavalent chromium-remaining concentration. The results are also shown in Table 7.

Further, a water reducing agent was used so that the slump value of the concrete would be 18±1.5 cm.

| Materials used | |
|---|---|
| Slag powder (13): | Slowly cooled slag powder, non-sulfuric acid form sulfur: 0.9%, degree of vitrification: 5%, Blaine value: 4,000 cm²/g, density: 3.00 g/cm³ |
| Slag powder (14): | Slowly cooled slag powder, non-sulfuric acid form sulfur: 0.9%, degree of vitrification: 5%, Blaine value: 4,500 cm²/g, density: 3.00 g/cm³ |
| Slag powder (15): | Slowly cooled slag powder, non-sulfuric acid form sulfur: 0.9%, degree of vitrification: 5%, Blaine value: 5,000 cm²/g, density: 3.00 g/cm³ |
| Slag powder (16): | Slowly cooled slag powder, non-sulfuric acid form sulfur: 0.9%, degree of vitrification: 5%, Blaine value: 6,000 cm²/g, density: 3.00 g/cm³ |
| Slag powder (17): | Slowly cooled slag powder, non-sulfuric acid form sulfur: 0.9%, degree of vitrification: 5%, Blaine value: 8,000 cm²/g, density: 3.00 g/cm³ |
| Slag powder (18): | One obtained by immersing slag powder (16) in water for aging to bring the non-sulfuric acid form sulfur to be 0.7%, degree of vitrification: 5%, Blaine value: 6,000 cm²/g, density: 3.00 g/cm³ |
| Slag powder (19): | One obtained by immersing slag powder (16) in water for aging to bring the non-sulfuric acid form sulfur to be 0.5%, degree of vitrification: 5%, Blaine value: 6,000 cm²/g, density: 3.00 g/cm³ |
| Slag powder (20): | One obtained by immersing slag powder (16) in water for aging to bring the non-sulfuric acid form sulfur to be 0.3%, degree of vitrification: 5%, Blaine value: 6,000 cm²/g, density: 3.00 g/cm³ |
| Slag powder (21): | Slowly cooled slag powder, non-sulfuric acid form sulfur: 0.7%, degree of vitrification: 10%, Blaine value: 6,000 cm²/g, density: 2.97 g/cm³ |
| Slag powder (22): | Slowly cooled slag powder, non-sulfuric acid form sulfur: 0.5%, degree of vitrification: 30%, Blaine value: 6,000 cm²/g, density: 2.94 g/cm³ |
| Slag powder (23): | Granulated blast furnace slag powder, non-sulfuric acid form sulfur: 0.1%, degree of vitrification: 95%, Blaine value: 6,000 cm²/g, density: 2.90 g/cm³ |

Measuring Method

Hexavalent Chromium-Remaining Concentration:

In order to confirm the hexavalent chromium-reducing ability of the cement admixture, a hexavalent chromium standard solution was diluted to prepare a solution having a hexavalent chromium concentration of 100 mg/l, and 10 g of each cement admixture was put into 50 cc of this hexavalent chromium solution, followed by stirring. Upon expiration of seven days, solid-liquid separation was carried out, and the remaining hexavalent chromium concentration in the liquid phase was measured and evaluated. Here, the remaining concentration of hexagonal chromium was measured by an ICP emission spectrochemical analysis in accordance with JIS K 0102.

TABLE 7

| Test No. | Unit weight (kg/cm³) | | | | | Slump loss | Hexavalent chromium remaining concentration | Notes |
|---|---|---|---|---|---|---|---|---|
| | Cement | Water | Sand | Gravel | Slag powder | | | |
| 7-1 | 245 | 175 | 804 | 951 | (13)105 | 8.5 | 9 | Ex. |
| 7-2 | 245 | 175 | 804 | 951 | (14)105 | 7.5 | 6 | Ex. |

TABLE 7-continued

| Test No. | Unit weight (kg/cm³) | | | | | Slump loss | Hexavalent chromium remaining concentration | Notes |
|---|---|---|---|---|---|---|---|---|
| | Cement | Water | Sand | Gravel | Slag powder | | | |
| 7-3 | 245 | 175 | 804 | 951 | (15)105 | 6.5 | 3 | Ex. |
| 7-4 | 245 | 175 | 804 | 951 | (16)105 | 6.0 | ND | Ex. |
| 7-5 | 245 | 175 | 804 | 951 | (17)105 | 5.0 | ND | Ex. |
| 7-6 | 245 | 175 | 804 | 951 | (18)105 | 7.0 | 17 | Ex. |
| 7-7 | 245 | 175 | 804 | 951 | (19)105 | 8.0 | 35 | Ex. |
| 7-8 | 245 | 175 | 804 | 951 | (20)105 | 10.0 | 68 | Comp. Ex. |
| 7-9 | 245 | 175 | 804 | 951 | (21)105 | 7.0 | 19 | Ex. |
| 7-10 | 245 | 175 | 803 | 950 | (22)105 | 8.5 | 38 | Ex. |
| 7-11 | 245 | 175 | 803 | 950 | (23)105 | 11.5 | 82 | Comp. Ex. |
| 7-12 | 245 | 175 | 799 | 946 | * 105 | 11.5 | 100 | Comp. Ex. |

The slump loss is represented by "cm" and the hexavalent chromium remaining concentration by "mg/l", and symbol * for the slag means fine limestone powder, and ND for the hexavalent chromium remaining concentration means "not detected".

TEST EXAMPLE 8

This test was carried out in the same manner as in Test Example 7 except that using the slag powder (16) as identified in Table 8, concretes having concrete blend compositions as identified in Table 8 were prepared, and the slump loss was measured. The results are also shown in Table 8.

TABLE 8

| Test No. | Unit weight (kg/cm³) | | | | | Slump loss |
|---|---|---|---|---|---|---|
| | Cement | Water | Sand | Gravel | Slag powder | |
| 8-1 | 339 | 175 | 806 | 954 | 11 | 11.5 |
| 8-2 | 332 | 175 | 806 | 954 | 18 | 10.5 |
| 8-3 | 315 | 175 | 805 | 953 | 35 | 9.5 |
| 8-4 | 280 | 175 | 805 | 952 | 70 | 8.5 |
| 8-5 | 210 | 175 | 803 | 950 | 140 | 5.0 |
| 8-6 | 175 | 175 | 803 | 950 | 175 | 4.0 |
| 8-7 | 140 | 175 | 802 | 949 | 210 | 3.0 |

Slump loss is represented by "cm"

TEST EXAMPLE 9

This test was carried out in the same manner as in Example 7 except that using cement A as identified in Table 9, high fluidity concretes having concrete blend compositions as identified in Table 9, were prepared, and segregation and a change with time of slump flow were measured. The results are also shown in Table 9.

Further, a water reducing agent was used in combination so that the slump flow value of the concretes would be 600±50 mm.

| Measuring methods | |
|---|---|
| Segregation: | Visually observed. A case where segregation resulted is represented by x, a case where slight segregation was observed, is represented by Δ, and a case where no segregation resulted, is represented by o. |
| Slump flow: | Spreading of concrete was measured at two points in right angle directions in accordance with "Underwater Non-separable Concrete Manual, Appendix 1 "Test On Underwater Non-separable Concrete, Test On Slump Flow", published by Foundation, Coastal Development Technical Center and the Japanese Institute of Technology on Fishing Ports and Communities, and the average value was taken as the slump flow. |

TABLE 9

| Test No. | Unit weight (kg/cm³) | | | | | Segregation | Slump flow | | | Notes |
|---|---|---|---|---|---|---|---|---|---|---|
| | Cement | Water | Sand | Gravel | Slag powder | | 0 min | 60 min | 120 min | |
| 9-1 | 300 | 165 | 769 | 839 | (13)250 | Δ | 665 | 680 | 550 | Ex. |
| 9-2 | 300 | 165 | 769 | 839 | (14)250 | ○ | 670 | 680 | 560 | Ex. |
| 9-3 | 300 | 165 | 769 | 839 | (15)250 | ○ | 675 | 685 | 570 | Ex. |
| 9-4 | 300 | 165 | 769 | 839 | (16)250 | ○ | 675 | 685 | 605 | Ex. |
| 9-5 | 300 | 165 | 769 | 839 | (17)250 | ○ | 670 | 685 | 625 | Ex. |
| 9-6 | 300 | 165 | 769 | 839 | (18)250 | ○ | 680 | 675 | 580 | Ex. |
| 9-7 | 300 | 165 | 769 | 839 | (19)250 | ○ | 670 | 660 | 525 | Ex. |
| 9-8 | 300 | 165 | 769 | 839 | (20)250 | ○ | 670 | 550 | 370 | Comp. Ex. |

TABLE 9-continued

| Test No. | Unit weight (kg/cm³) | | | | | Slump flow | | | Notes |
| | Cement | Water | Sand | Gravel | Slag powder | Segregation | 0 min | 60 min | 120 min | |
| --- | --- | --- | --- | --- | --- | --- | --- | --- | --- | --- |
| 9-9 | 300 | 165 | 767 | 837 | (21)250 | ○ | 675 | 670 | 560 | Ex. |
| 9-10 | 300 | 165 | 766 | 836 | (22)250 | ○ | 675 | 655 | 510 | Ex. |
| 9-11 | 300 | 165 | 765 | 835 | (23)250 | ○ | 685 | 390 | — | Comp. Ex. |
| 9-12 | 300 | 165 | 757 | 826 | * 250 | ○ | 680 | 410 | — | Comp. Ex. |

Symbol * for slag means fine limestone powder, and symbol — for slump flow means "not measurable".

TEST EXAMPLE 10

This test was carried out in the same manner as in Test Example 1 except that concretes having concrete blend compositions as identified in Table 10 were prepared, and the slump loss, compression strength, adiabatic temperature increase, neutralization depth, further, effects of the present cement admixture for reducing hexavalent chromium, were measured by prescribed methods. The results are also shown in Table 10.

| Materials used | |
| --- | --- |
| Slag powder (24): | Slowly cooled slag powder, $CO_2$ absorption: 2.0%, amount of bound water: 2.0%, non-sulfuric acid form sulfur: 0.9%, soluble sulfur concentration: 300 mg/l, oxygen consumption: $7.5 \times 10^{-3}$ mmol$O_2$/g, oxidation-reduction potential: 225 mV, degree of vitrification: 5%, melilite lattice constant a: 7.78, Blaine specific surface area: 4,000 cm²/g, density: 3.00 g/cm³. |
| Slag powder (25): | Slowly cooled slag powder, $CO_2$ absorption: 3.0%, amount of bound water: 2.5%, non-sulfuric acid form sulfur: 0.9%, soluble sulfur concentration: 340 mg/l, oxygen consumption: $9.2 \times 10^{-3}$ mmol$O_2$/g, oxidation-reduction potential: 246 mV, degree of vitrification: 5%, melilite lattice constant a: 7.78, Blaine specific surface area: 4,500 cm²/g, density: 3.00 g/cm³. |
| Slag powder (26): | Slowly cooled slag powder, $CO_2$ absorption: 3.5%, amount of bound water: 2.7%, non-sulfuric acid form sulfur: 0.9%, soluble sulfur concentration: 380 mg/l, oxygen consumption: $9.6 \times 10^{-3}$ mmol$O_2$/g, oxidation-reduction potential: 270 mV, degree of vitrification: 5%, melilite lattice constant a: 7.78, Blaine specific surface area: 5,000 cm²/g, density: 3.00 g/cm³. |
| Slag powder (27): | Slowly cooled slag powder, $CO_2$ absorption: 4.0%, amount of bound water: 3.0%, non-sulfuric acid form sulfur: 0.9%, soluble sulfur concentration: 418 mg/l, oxygen consumption: $10.3 \times 10^{-3}$ mmol$O_2$/g, oxidation-reduction potential: 290 mV, degree of vitrification: 5%, melilite lattice constant a: 7.78, Blaine specific surface area: 6,000 cm²/g, density: 3.00 g/cm³. |
| Slag powder (28): | Slowly cooled slag powder, $CO_2$ absorption: 4.5%, amount of bound water: 4.0%, non-sulfuric acid form sulfur: 0.9%, soluble sulfur concentration: 508 mg/l, oxygen consumption: $12.2 \times 10^{-3}$ mmol$O_2$/g, oxidation-reduction potential: 350 mV, degree of vitrification: 5%, melilite lattice constant a: 7.78, Blaine specific surface area: 8,000 cm²/g, density: 3.00 g/cm³. |
| Slag powder (29): | Slowly cooled slag powder, $CO_2$ absorption: 4.0%, amount of bound water: 3.0%, non-sulfuric acid form sulfur: 0.7%, soluble sulfur concentration: 325 mg/l, oxygen consumption: $7.7 \times 10^{-3}$ mmol$O_2$/g, oxidation-reduction potential: 230 mV, degree of vitrification: 5%, melilite lattice constant a: 7.78, Blaine specific surface area: 6,000 cm²/g, density: 3.00 g/cm³. |
| Slag powder (30): | Slowly cooled slag powder, $CO_2$ absorption: 4.0%, amount of bound water: 3.0%, non-sulfuric acid form sulfur: 0.5%, soluble sulfur concentration: 229 mg/l, oxygen consumption: $6.3 \times 10^{-3}$ mmol$O_2$/g, oxidation-reduction potential: 218 mV, degree of vitrification: 5%, melilite lattice constant a: 7.78, Blaine specific surface area: 6,000 cm²/g, density: 3.00 g/cm³. |
| Slag powder (31): | Slowly cooled slag powder, $CO_2$ absorption: 4.0%, amount of bound water: 3.0%, non-sulfuric acid form sulfur: 0.3%, soluble sulfur concentration: 138 mg/l, oxygen consumption: $4.2 \times 10^{-3}$ mmol$O_2$/g, oxidation-reduction potential: 178 mV, degree of vitrification: 5%, melilite lattice constant a: 7.78, Blaine specific surface area: 6,000 cm²/g, density: 3.00 g/cm³. |

-continued

| Materials used | |
|---|---|
| Slag powder (32): | Slowly cooled slag powder, $CO_2$ absorption: 4.0%, amount of bound water: 3.5%, non-sulfuric acid form sulfur: 0.7%, soluble sulfur concentration: 375 mg/l, oxygen consumption: $6.3 \times 10^{-3}$ mmol$O_2$/g, oxidation-reduction potential: 223 mV, degree of vitrification: 10%, melilite lattice constant a: 7.76, Blaine specific surface area: 6,000 cm$^2$/g, density: 2.97 g/cm$^3$. |
| Slag powder (33): | Slowly cooled slag powder, $CO_2$ absorption: 3.0%, amount of bound water: 5.0%, non-sulfuric acid form sulfur: 0.5%, soluble sulfur concentration: 291 mg/l, oxygen consumption: $3.0 \times 10^{-3}$ mmol$O_2$/g, oxidation-reduction potential: 143 mV, degree of vitrification: 30%, melilite lattice constant a: 7.74, Blaine specific surface area: 6,000 cm$^2$/g, density: 2.94 g/cm$^3$. |
| Slag powder (34): | Granulated blast furnace slag, $CO_2$ absorption: 1.0%, amount of bound water: 9.5%, non-sulfuric acid form sulfur: 0.9%, soluble sulfur concentration: 10 mg/l, oxygen consumption: $2.0 \times 10^{-3}$ mmol$O_2$/g, oxidation-reduction potential: 99 mV, degree of vitrification: 95%, Blaine specific surface area: 6,000 cm$^2$/g, density: 2.90 g/cm$^3$. |

TABLE 10

| Test No. | Unit weight (kg/cm$^3$) | | | | | Slump loss | Compression strength | Adiabatic temperature increase | Neutralization depth | Hexavalent chromium remaining concentration | Notes |
|---|---|---|---|---|---|---|---|---|---|---|---|
| | Cement | Water | Sand | Gravel | Slag powder | | | | | | |
| 10-1 | 245 | 175 | 804 | 951 | (24)105 | 9.5 | 24.1 | 33.1 | 26.5 | 8 | Ex. |
| 10-2 | 245 | 175 | 804 | 951 | (25)105 | 9.0 | 24.2 | 33.4 | 23.5 | 5 | Ex. |
| 10-3 | 245 | 175 | 804 | 951 | (26)105 | 8.0 | 24.3 | 34.1 | 20.0 | 2 | Ex. |
| 10-4 | 245 | 175 | 804 | 951 | (27)105 | 7.0 | 24.6 | 34.9 | 18.0 | ND | Ex. |
| 10-5 | 245 | 175 | 804 | 951 | (28)105 | 7.0 | 24.9 | 35.0 | 16.0 | ND | Ex. |
| 10-6 | 245 | 175 | 804 | 951 | (29)105 | 7.5 | 24.7 | 34.9 | 16.5 | 16 | Ex. |
| 10-7 | 245 | 175 | 804 | 951 | (30)105 | 8.5 | 25.0 | 35.3 | 15.5 | 33 | Ex. |
| 10-8 | 245 | 175 | 804 | 951 | (31)105 | 10.0 | 24.9 | 35.1 | 16.0 | 60 | Comp. Ex. |
| 10-9 | 245 | 175 | 804 | 951 | (32)105 | 7.0 | 25.0 | 35.1 | 17.5 | 17 | Comp. Ex. |
| 10-10 | 245 | 175 | 804 | 951 | (33)106 | 8.0 | 26.0 | 36.0 | 17.5 | 37 | Ex. |
| 10-11 | 245 | 175 | 804 | 951 | (34)106 | 11.5 | 34.0 | 44.2 | — | 99 | Ex. |
| 10-12 | 350 | 175 | 806 | 954 | —0 | 12.0 | 33.5 | 45.5 | — | — | Ex. |
| 10-13 | 339 | 175 | 806 | 954 | (27)11 | 11.0 | 33.2 | 43.1 | — | — | Ex. |
| 10-14 | 332 | 175 | 806 | 954 | (27)18 | 10.5 | 32.8 | 43.0 | — | — | Ex. |
| 10-15 | 315 | 175 | 805 | 953 | (27)35 | 9.5 | 30.1 | 40.8 | — | — | Ex. |
| 10-16 | 280 | 175 | 805 | 952 | (27)70 | 8.0 | 28.1 | 37.0 | — | — | Ex. |
| 10-17 | 210 | 175 | 803 | 950 | (27)140 | 6.5 | 22.9 | 32.1 | — | — | Ex. |
| 10-18 | 175 | 175 | 803 | 950 | (27)175 | 5.5 | 21.3 | 28.6 | — | — | Ex. |
| 10-19 | 140 | 175 | 802 | 949 | (27)210 | 4.0 | 18.7 | 24.8 | — | — | Ex. |
| 10-20 | 245 | 175 | 804 | 951 | *105 | 11.5 | 24.8 | 34.5 | 42.5 | 100 | Comp. Ex. |

Symbol * for slag powder means fine limestone powder, and the slump loss is represented by "cm", the compression strength by "N/mm$^2$", the adiabatic temperature increase by "° C.", the neutralization depth by "mm", and the hexavalent chromium remaining concentration by "mg/l", and ND for the hexavalent chromium remaining concentration means "not detected".

TEST EXAMPLE 11

This test was carried out in the same manner as in Test Example 10 except that concretes having blend compositions as identified in Table 11 were prepared by using various slowly cooled slag powders which are the same in the known sulfuric acid form sulfur amount, soluble sulfur concentration, degree of vitrification and grain value and which are different only in the melilite lattice constant a. The results are also shown in Table 11.

| Materials used | |
|---|---|
| Slag powder (35): | Slowly cooled slag powder, $CO_2$ absorption: 4.0%, amount of bound water: 3%, non-sulfuric acid form sulfur: 0.9%, soluble sulfur concentration: 508 mg/l, degree of vitrification: 5%, melilite lattice constant a: 7.73, Blaine specific surface area: 6,000 $cm^2/g$, density: 3.03 $g/cm^3$. |
| Slag powder (36): | Slowly cooled slag powder, $CO_2$ absorption: 4.5%, amount of bound water: 3%, non-sulfuric acid form sulfur: 0.9%, soluble sulfur concentration: 508 mg/l, degree of vitrification: 5%, melilite lattice constant a: 7.75, Blaine specific surface area: 6,000 $cm^2/g$, density: 3.01 $g/cm^3$. |
| Slag powder (37): | Slowly cooled slag powder, $CO_2$ absorption: 4.5%, amount of bound water: 3%, non-sulfuric acid form sulfur: 0.9%, soluble sulfur concentration: 508 mg/l, degree of vitrification: 5%, melilite lattice constant a: 7.80, Blaine specific surface area: 6,000 $cm^2/g$, density: 2.98 $g/cm^3$. |
| Slag powder (38): | Slowly cooled slag powder, $CO_2$ absorption: 4.0%, amount of bound water: 3%, non-sulfuric acid form sulfur: 0.9%, soluble sulfur concentration: 508 mg/l, degree of vitrification: 5%, melilite lattice constant a: 7.83, Blaine specific surface area: 6,000 $cm^2/g$, density: 2.96 $g/cm^3$. |

TEST EXAMPLE 12

This test was carried out in the same manner as in Test Example 3 except that 65 parts of the Portland cement as identified in Table 12 and 35 parts of the slag powder (25) were used. The results are also shown in Table 12.

TABLE 12

| Test No. | Cement | Slag powder | Compression strength | | | Notes |
|---|---|---|---|---|---|---|
| | | | 1 day | 3 days | 7 days | |
| 3-1 | A | Nil | 10.5 | 23.0 | 41.0 | Comp. Ex. |
| 12-1 | A | 35 | 8.0 | 16.6 | 29.9 | Ex. |
| 12-2 | B | 35 | 13.0 | 26.6 | 45.0 | Ex. |
| 12-3 | C | 35 | 11.9 | 24.0 | 43.3 | Ex. |

The slag powder is represented by "parts" per 100 parts of the powder, and the compression strength is represented by "$N/mm^2$".

TEST EXAMPLE 13

This test was carried out in the same manner as in Test Example 4 except that cement B was used, and the slowly cooled slag powder (25) as identified in Table 13 was used in 100 parts of the cement composition comprising the cement and the slag powder. The results are also shown in Table 13.

TABLE 13

| Test No. | Cement | Slag powder | Compression strength | | | Notes |
|---|---|---|---|---|---|---|
| | | | 1 day | 3 days | 7 days | |
| 3-1 | A | Nil | 10.5 | 23.0 | 41.0 | Comp. Ex. |
| 13-1 | B | 10 | 19.4 | 39.1 | 54.3 | Ex. |
| 13-2 | B | 20 | 18.0 | 35.8 | 50.5 | Ex. |
| 13-3 | B | 30 | 15.5 | 32.0 | 47.0 | Ex. |
| 12-2 | B | 35 | 13.0 | 26.6 | 45.0 | Comp. Ex. |
| 13-4 | B | 40 | 12.5 | 24.9 | 44.2 | Ex. |
| 13-5 | B | 50 | 11.7 | 24.5 | 43.0 | Ex. |

TABLE 11

| Test No. | Unit weight ($kg/cm^3$) | | | | | Slump loss | Compression strength | Adiabatic temperature increase | Neutralization depth | Hexavalent chromium remaining concentration | Notes |
|---|---|---|---|---|---|---|---|---|---|---|---|
| | Cement | Water | Sand | Gravel | Slag powder | | | | | | |
| 11-1 | 245 | 175 | 804 | 951 | (35)105 | 7.0 | 24.7 | 34.7 | 21.5 | ND | Ex. |
| 11-2 | 245 | 175 | 804 | 951 | (36)105 | 7.5 | 24.4 | 34.8 | 20.5 | ND | Ex. |
| 10-4 | 245 | 175 | 804 | 951 | (27)105 | 7.0 | 24.6 | 34.9 | 18.0 | ND | Ex. |
| 11-3 | 245 | 175 | 804 | 951 | (37)106 | 7.5 | 24.2 | 34.9 | 19.5 | ND | Ex. |
| 11-4 | 245 | 175 | 804 | 951 | (38)107 | 7.0 | 24.8 | 34.5 | 20.0 | ND | Ex. |

The slump loss is represented by "cm", the compression strength by "$N/mm^2$", the adiabatic temperature increase by "° C.", the neutralization depth by "mm", and ND for the hexavalent chromium remaining concentration means "not detected".

The slag powder is represented by "parts" per 100 parts of the powder, and the compression strength is represented by "N/mm²".

TEST EXAMPLE 14

This test was carried out in the same manner as in Test Example 5 except that the slowly cooled slag powder as identified in Table 14 was used. The results are also shown in Table 14.

TEST EXAMPLE 16

This test was carried out in the same manner as in Test Example 7 except that the hexavalent chromium-reducing effect of the slag was evaluated by mixing a reducing agent (ferrous sulfate, guaranteed reagent, manufactured by Kanto Chemical Co., Inc.) as identified in Table 8 to the above slag powder (14). The results are shown in Table 16.

TABLE 14

| Test No. | Unit weight (kg/cm³) | | | | | Seg-regation | Slump flow | | Autogenous shrinkage | Adiabatic Temperature increase | Compression strength | Neutralization depth | Notes |
| | Cement | Water | Sand | Gravel | Slag powder | | 0 min | 60 min | | | | | |
| --- | --- | --- | --- | --- | --- | --- | --- | --- | --- | --- | --- | --- | --- |
| 14-1 | 300 | 165 | 769 | 839 | (24) 250 | Δ | 660 | 670 | −40 | 41.5 | 52.3 | 4.5 | Ex. |
| 14-2 | 300 | 165 | 769 | 839 | (25) 250 | ○ | 665 | 675 | −30 | 41.5 | 53.6 | 3.5 | Ex. |
| 14-3 | 300 | 165 | 769 | 839 | (26) 250 | ○ | 670 | 675 | −30 | 41.8 | 54.2 | 3.0 | Ex. |
| 14-4 | 300 | 165 | 769 | 839 | (27) 250 | ○ | 675 | 675 | −30 | 42.1 | 54.6 | 2.5 | Ex. |
| 14-5 | 300 | 165 | 769 | 839 | (28) 250 | ○ | 675 | 675 | −30 | 42.3 | 55.1 | 2.0 | Ex. |
| 14-6 | 300 | 165 | 767 | 837 | (29) 250 | ○ | 670 | 670 | −30 | 41.8 | 54.5 | 2.0 | Ex. |
| 14-7 | 300 | 165 | 766 | 836 | (30) 250 | ○ | 665 | 660 | −30 | 41.9 | 54.0 | 2.0 | Ex. |
| 14-8 | 300 | 165 | 766 | 836 | (31) 250 | ○ | 660 | 540 | −30 | 42.1 | 54.0 | 2.5 | Ex. |
| 14-9 | 300 | 165 | 766 | 836 | (32) 250 | ○ | 670 | 660 | −100 | 43.1 | 60.3 | 1.5 | Ex. |
| 14-10 | 300 | 165 | 766 | 836 | (33) 250 | ○ | 670 | 550 | −200 | 47.0 | 70.0 | 0.5 | Ex. |
| 14-11 | 300 | 165 | 765 | 835 | (34) 250 | ○ | 675 | 395 | −380 | 66.9 | 79.7 | 1.5 | Comp. Ex. |
| 5-9 | 300 | 165 | 757 | 826 | * 250 | ○ | 680 | 410 | −40 | 42.3 | 55.0 | 12.5 | Comp. Ex. | slump flow is represented by "mm", the autogenous shrinkage by a strain "×10⁻⁶", the adiabatic temperature increase by "° C.", the compression strength by "N/mm²", and the neutralization depth by "mm" and symbol * for slag powder means fine limestone powder

TEST EXAMPLE 15

This test was carried out in the same manner as in Test Example 6 except that the slowly cooled slag powder (36) was used. The results are also shown in Table 15.

TABLE 15

| Test No. | Unit weight (kg/cm³) | | | | | Seg-regation | Slump flow | | Autogenous shrinkage | Adiabatic Temperature increase | Compression strength | Neutralization depth | Notes |
| | Cement | Water | Sand | Gravel | Slag powder | | 0 min | 60 min | | | | | |
| --- | --- | --- | --- | --- | --- | --- | --- | --- | --- | --- | --- | --- | --- |
| 15-1 | 250 | 165 | 768 | 838 | (27) 300 | ○ | 685 | 685 | +50 | 36.7 | 43.5 | 2.5 | Ex. |
| 15-2 | 275 | 165 | 768 | 838 | (27) 275 | ○ | 680 | 680 | −20 | 38.4 | 50.2 | 2.5 | Ex. |
| 14-4 | 300 | 165 | 769 | 839 | (27) 250 | ○ | 675 | 675 | −30 | 42.1 | 54.6 | 2.5 | Ex. |
| 15-3 | 325 | 165 | 769 | 839 | (27) 225 | ○ | 675 | 675 | −100 | 44.0 | 56.0 | 2.5 | Ex. |
| 15-4 | 350 | 165 | 769 | 839 | (27) 200 | ○ | 675 | 660 | −160 | 46.3 | 62.5 | 2.5 | Ex. |
| 15-5 | 450 | 165 | 771 | 842 | (27) 100 | ○ | 670 | 590 | −240 | 56.6 | 70.3 | 0.5 | Ex. |
| 15-6 | 550 | 165 | 773 | 844 | — 0 | ○ | 655 | 375 | −370 | 66.5 | 78.3 | 0.5 | Comp. Ex. |
| 15-7 | 300 | 165 | 873 | 953 | — 0 | X | — | — | — | — | — | — | Comp. Ex. |
| 15-8 | 300 | 125 | 820 | 895 | (27) 250 | ○ | 695 | 675 | −130 | 42.0 | 63.5 | 0.0 | Ex. |
| 15-9 | 300 | 175 | 757 | 826 | (27) 250 | ○ | 690 | 665 | −20 | 42.1 | 48.8 | 3.0 | Ex. |
| 15-10 | 300 | 200 | 725 | 792 | (27) 250 | ○ | 680 | 615 | +100 | 42.2 | 34.0 | 5.5 | Ex. |
| 15-11 | 300 | 225 | 694 | 757 | (27) 250 | ○ | 650 | 560 | +140 | 42.2 | 29.0 | 11.0 | Ex. |
| 15-12 | 300 | 165 | 759 | 828 | (27) 275 | ○ | 665 | 670 | −50 | 42.3 | 53.4 | 2.5 | Ex. |
| 15-13 | 300 | 165 | 748 | 817 | (27) 300 | ○ | 665 | 660 | −50 | 42.0 | 53.9 | 3.0 | Ex. |
| 15-14 | 300 | 165 | 738 | 805 | (27) 325 | ○ | 670 | 665 | −40 | 42.3 | 53.7 | 2.0 | Ex. |
| 15-15 | 300 | 165 | 727 | 794 | (27) 350 | ○ | 665 | 670 | −50 | 42.1 | 54.0 | 1.5 | Ex. |

The slump flow is represented by "mm", the autogenous shrinkage by a strain "× 10⁻⁶", the adiabatic temperature increase by "° C.", the compression strength by "N/mm²", and the neutralization depth by "mm" and symbol — for the autogenous shrinkage in Test No. 1-7 means that segregation resulted, so that high fluidity concrete was not prepared.

TABLE 16

| Test No. | Slag powder (parts by weight) | Reducing agent (parts by weight) | Hexavalent chromium remaining concentration (mg/l) | Notes |
| --- | --- | --- | --- | --- |
| 16-1 | 50 | 50 | ND | Ex. |
| 16-2 | 90 | 10 | ND | Ex. |
| 16-3 | 95 | 5 | ND | Ex. |
| 16-4 | 99 | 1 | 2 | Ex. |
| 7-2 | 100 | 0 | 6 | Comp. Ex. |

INDUSTRIAL APPLICABILITY

By using the cement admixture of the present invention, the amount of clinker to be incorporated can be reduced, whereby a low environmental load type cement composition can be obtained, and by using such a cement composition, it is possible to obtain a concrete which has a small slump loss or heat of hydration and which is hardly neutralized.

Further, even when applied to a concrete having a low water/powder ratio such as a high fluidity concrete, it is possible to suppress autogenous shrinkage to a small level.

Further, an effect to reduce hexavalent chromium, will also be obtained.

The invention claimed is:

1. A cement admixture, comprising a slowly cooled slag powder, wherein:
   the slowly cooled slag powder contains melilite as its main component;
   the slowly cooled slag powder has a carbon dioxide absorption of at least 2% when carbonated for 7 days in air having a carbon dioxide concentration of 5%, a temperature of 30° C. and a relative humidity of 60%; and
   the slowly cooled slag powder has a melilite lattice constant of from 7.75 to 7.82.

2. A cement admixture, comprising a slowly cooled slag powder, wherein:
   the slowly cooled slag powder contains melilite as its main component;
   the slowly cooled slag powder has a loss on ignition of at most 5%, loss on ignition being a weight reduction when ignited at 1,000° C. for 30 minutes; and
   the slowly cooled slag powder has a melilite lattice constant of from 7.75 to 7.82.

3. A cement admixture, comprising:
   a slowly cooled slag powder, wherein:
   the slowly cooled slag powder contains melilite as its main component;
   the slowly cooled slag powder contains at least 0.5% of sulfur of a non-sulfuric acid form; and
   the slowly cooled slag powder has a melilite lattice constant of from 7.75 to 7.82.

4. A cement admixture, comprising a slowly cooled slag powder, wherein:
   the slowly cooled slag powder contains melilite as its main component;
   the slowly cooled slag powder has an ion concentration of non-sulfuric acid form sulfur to elute, of at least 100 mg/l; and
   the slowly cooled slag powder has a melilite lattice constant of from 7.75 to 7.82.

5. The cement admixture according to claim 1, wherein the slowly cooled slag powder has a loss on ignition of at most 5%, loss on ignition being a weight reduction when ignited at 1,000° C. for 30 minutes.

6. The cement admixture according to claim 1, wherein the slowly cooled slag powder contains at least 0.5% of sulfur present in a non-sulfuric acid form.

7. The cement admixture according to claim 1, wherein the slowly cooled slag powder has a concentration of non-sulfuric acid form sulfur to elute, of at least 100 mg/l.

8. The cement admixture according to claim 1, wherein the slowly cooled slag powder has a degree of vitrification of at most 30%.

9. The cement admixture according to claim 1, wherein the slowly cooled slag powder has a Blaine specific surface area of at least 4000 $cm^2/g$.

10. The cement admixture according to claim 1, wherein the admixture has an oxygen consumption of at least $2.5 \times 10^{-3}$ mmol $O_2/g$.

11. The cement admixture according to claim 1, wherein the admixture has an oxidation-reduction potential of at least 100 mV.

12. A cement composition comprising the cement admixture according to claim 1.

13. The cement composition according to claim 12, wherein the cement comprises Portland cement having a $3CaO.SiO_2$ content of at least 60 wt %.

14. Cement concrete comprising the cement composition according to claim 12.

15. The cement concrete according to claim 14, wherein the concrete has a slump flow of 650±50 mm.

16. Cement concrete comprising the cement composition according to claim 13.

17. The cement admixture according to claim 1, wherein:
   the slowly cooled slag powder has a loss on ignition of at most 5%, loss on ignition being a weight reduction when ignited at 1,000° C. for 30 minutes; and
   the slowly cooled slag powder contains at least 0.5% of sulfur of a non-sulfuric acid form.

18. The cement admixture according to claim 3, wherein the slowly cooled slag powder has a loss on ignition of at most 5%, loss on ignition being a weight reduction when ignited at 1,000° C. for 30 minutes.

19. The cement admixture according to claim 4, wherein the slowly cooled slag powder has a loss on ignition of at most 5%, loss on ignition being a weight reduction when ignited at 1,000° C. for 30 minutes.

* * * * *

UNITED STATES PATENT AND TRADEMARK OFFICE
CERTIFICATE OF CORRECTION

| | | |
|---|---|---|
| PATENT NO. | : 7,459,020 B2 | Page 1 of 1 |
| APPLICATION NO. | : 10/489316 | |
| DATED | : December 2, 2008 | |
| INVENTOR(S) | : Morioka et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 929 days.

Signed and Sealed this
Second Day of October, 2012

David J. Kappos
*Director of the United States Patent and Trademark Office*